(12) United States Patent
Yin (10) Patent No.: US 10,681,330 B2
(45) Date of Patent: Jun. 9, 2020

(54) DISPLAY PROCESSING DEVICE AND DISPLAY PROCESSING METHOD THEREOF AND DISPLAY APPARATUS

(71) Applicant: BOE TECHNOLOGY GROUP CO., LTD., Beijing (CN)

(72) Inventor: Xinshe Yin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 16/067,995

(22) PCT Filed: Dec. 20, 2017

(86) PCT No.: PCT/CN2017/117479
§ 371 (c)(1),
(2) Date: Jul. 3, 2018

(87) PCT Pub. No.: WO2018/205628
PCT Pub. Date: Nov. 15, 2018

(65) Prior Publication Data
US 2019/0327459 A1 Oct. 24, 2019

(30) Foreign Application Priority Data
Dec. 20, 2017 (CN) .......................... 2017 10 335816

(51) Int. Cl.
*H04N 7/18* (2006.01)
*H04N 13/156* (2018.01)
(Continued)

(52) U.S. Cl.
CPC ......... *H04N 13/156* (2018.05); *H04N 13/133* (2018.05); *H04N 13/139* (2018.05);
(Continued)

(58) Field of Classification Search
CPC .................................................... H04N 13/156
(Continued)

(56) References Cited

U.S. PATENT DOCUMENTS 6,614,927 B1 * 9/2003 Tabata ................. H04N 13/261
382/154
7,562,245 B1 * 7/2009 Cai ........................ G06F 1/3203
713/300
(Continued)

FOREIGN PATENT DOCUMENTS

CN          1835601 A     9/2006
CN       101520900 A     9/2009
(Continued)

OTHER PUBLICATIONS

Mo Seong, 3D Video Converting System, 2014.*
(Continued)

*Primary Examiner* — Leron Beck
(74) *Attorney, Agent, or Firm* — Dilworth & Barrese, LLP.; Michael J. Musella, Esq.

(57) ABSTRACT

A display processing device, a display processing method, and a display apparatus are disclosed. The display processing device includes a 3D image processing chip and a 2D image processing chip. The 3D image processing chip is configured to receive a 3D image signal, and process the 3D image signal into a 2D image signal in which left and right eye images are respectively arranged in alternate rows; and the 3D image processing chip is configured to transmit 2D image signal in which left and right eye images are respectively arranged in alternate rows obtained after processing to the 2D image processing chip, and the 2D image processing chip is configured to perform image processing on the 2D image signal.

15 Claims, 3 Drawing Sheets

(51) Int. Cl.
*H04N 13/15* (2018.01)
*H04N 13/167* (2018.01)
*H04N 13/139* (2018.01)
*H04N 13/194* (2018.01)
*H04N 13/133* (2018.01)
*H04N 13/398* (2018.01)

(52) U.S. Cl.
CPC ........... *H04N 13/15* (2018.05); *H04N 13/167* (2018.05); *H04N 13/194* (2018.05); *H04N 13/398* (2018.05)

(58) Field of Classification Search
USPC .......................................................... 348/43
See application file for complete search history.

(56) References Cited

U.S. PATENT DOCUMENTS

| | | | | |
|---|---|---|---|---|
| 7,768,314 | B2* | 8/2010 | Matsumoto | H01L 27/11803 307/104 |
| 8,046,727 | B2* | 10/2011 | Solomon | G06F 17/5045 326/101 |
| 8,525,927 | B1* | 9/2013 | Chen | H04N 7/0117 345/690 |
| 8,885,102 | B1* | 11/2014 | Suzuki | H04N 11/08 348/488 |
| 8,989,556 | B2* | 3/2015 | Ogawa | H04N 19/597 386/241 |
| 9,131,209 | B1* | 9/2015 | Demirbage | H04N 13/122 |
| 9,325,981 | B2* | 4/2016 | Kang | H04N 13/341 |
| 2004/0218269 | A1* | 11/2004 | Divelbiss | H04N 13/337 359/464 |
| 2007/0195408 | A1* | 8/2007 | Divelbiss | G02B 26/008 359/462 |
| 2008/0218433 | A1* | 9/2008 | Hong | G02B 27/2214 345/6 |
| 2010/0323609 | A1* | 12/2010 | Aramaki | H04N 13/398 455/3.01 |
| 2011/0043614 | A1* | 2/2011 | Kitazato | H04N 21/235 348/51 |
| 2011/0063419 | A1* | 3/2011 | Lee | H04N 13/305 348/47 |
| 2011/0126159 | A1* | 5/2011 | Ko | G06F 3/04847 715/848 |
| 2011/0298803 | A1* | 12/2011 | King | A63F 13/25 345/427 |
| 2011/0310096 | A1* | 12/2011 | Kim | G09G 5/00 345/419 |
| 2012/0081515 | A1* | 4/2012 | Jang | H04N 5/45 348/43 |
| 2012/0081516 | A1 | 4/2012 | Tsukagoshi | |
| 2012/0205520 | A1* | 8/2012 | Hsieh | H01L 27/14605 250/208.1 |
| 2012/0249752 | A1 | 10/2012 | Baba | |
| 2012/0304138 | A1* | 11/2012 | Farooq | G06F 17/5081 716/111 |
| 2013/0155206 | A1* | 6/2013 | Lazarski | H04N 17/045 17/45 |
| 2013/0249954 | A1* | 9/2013 | Chiu | H04N 13/398 345/690 |
| 2015/0163425 | A1* | 6/2015 | Oganesian | H04N 5/37455 348/302 |

FOREIGN PATENT DOCUMENTS

| | | |
|---|---|---|
| CN | 201986081 U | 9/2011 |
| CN | 102271273 A | 12/2011 |
| CN | 102281450 A | 12/2011 |
| CN | 102290025 A | 12/2011 |
| CN | 102474643 A | 5/2012 |
| CN | 102707449 A | 10/2012 |
| CN | 103026713 A | 4/2013 |
| CN | 103369338 A | 10/2013 |
| CN | 205304939 U | 6/2016 |
| EP | 2996089 A1 | 3/2016 |

OTHER PUBLICATIONS

International Search Report and Written Opinion dated Feb. 24, 2018.
Chinese Office Action dated Sep. 3, 2019.

* cited by examiner

DISPLAY PROCESSING DEVICE AND DISPLAY PROCESSING METHOD THEREOF AND DISPLAY APPARATUS

CROSS-REFERENCE

The application claims priority to the Chinese patent application No. 201710335816.3, filed on May 12, 2017, the entire disclosure of which is incorporated herein by reference as part of the present application.

TECHNICAL FIELD

Embodiments of the present disclosure relate to a display processing device, a display processing method thereof, and a display apparatus.

BACKGROUND

With the development of medical display technology, medical imaging diagnosis have changed from traditional hard-reading films, such as films to soft-reading films, such as medical display apparatus. DR, CR, CT, and 3D images and films are displayed on a medical monitor and then a diagnosis can be performed.

Medical display apparatus must meet the requirements for consistency and integrity of display quality, in addition to requirements such as high brightness, high contrast, high resolution, large size, high gray levels etc. Consistency refers to the display quality (brightness, grayscale, contrast, etc.) of the medical display apparatus needs to be consistent for the same image after the medical display apparatus having been used for different times. In addition, integrity refers to the display quality (brightness, grayscale, contrast, etc.) of the same image displayed on the medical display apparatuses of workstations in different locations is exactly the same, to ensure that the images seen by doctors in different locations are the same.

SUMMARY

The embodiments of the present disclosure provide a display processing device, a display processing method, and a display apparatus. The display processing device comprises a 3D image processing chip and a 2D image processing chip. The 3D image processing chip is configured to receive a 3D image signal and process the 3D image signal into a 2D image signal in which left and right eye images are respectively arranged in alternate rows; and the 3D image processing chip is configured to transmit the 2D image signal in which left and right eye images are respectively arranged in alternate rows obtained after processing to the 2D image processing chip, and the 2D image processing chip is configured to perform image processing on the 2D image signal.

At least one embodiment of the present disclosure provide a display processing device, comprising: a 3D image processing chip, configured to receive a 3D image signal and process the 3D image signal into a 2D image signal in which left and right eye images are respectively arranged in alternate rows; and a 2D image processing chip, wherein, the 3D image processing chip is configured to transmit the 2D image signal in which left and right eye images are respectively arranged in alternate rows obtained after processing to the 2D image processing chip, and the 2D image processing chip is configured to perform image processing on the 2D image signal.

For example, in the display processing device provided by an embodiment of the present disclosure, the 3D image processing chip comprises a 3D image processing module and a 3D image scaling module, and the 3D image processing module and the 3D image scaling module are configured to perform processing and scaling on the 3D image signal respectively to form the 2D image signal in which left and right eye images are respectively arranged in alternate rows.

For example, in the display processing device provided by an embodiment of the present disclosure, the 2D image processing chip comprises at least one of a 2D image processing module, a color correction module, and a 2D image scaling module, and the 2D image processing module is configured to perform 2D image processing on the 2D image signal in which left and right eye images are respectively arranged in alternate rows, and the color correction module is configured to perform color correction on the 2D image signal in which left and right eye images are respectively arranged in alternate rows, the 2D image scaling module is configured to perform scaling on the 2D image signal.

For example, in the display processing device provided by an embodiment of the present disclosure, the 3D image processing chip is further configured to receive a 2D image signal, and the 3D image processing chip is further configured to transmit the 2D image signal to the 2D image processing chip directly.

For example, in the display processing device provided by an embodiment of the present disclosure, the display processing device further comprises: a brightness stabilizing control module configured to adjust a brightness of emitting light of a backlight module in a display panel according to a display brightness of the display panel; the brightness stabilizing control module is integrated in the 2D image processing chip.

For example, in the display processing device provided by an embodiment of the present disclosure, the 3D image processing chip comprises a first signal interface configured to receive the 3D image signal and a 2D image signal.

For example, in the display processing device provided by an embodiment of the present disclosure, the first signal interface comprises at least one of a 3G-SDI and a DVI.

For example, in the display processing device provided by an embodiment of the present disclosure, the 3D image processing chip and the 2D image processing chip are connected by a high-speed interface.

For example, in the display processing device provided by an embodiment of the present disclosure, the 2D image processing chip further comprises a second signal interface configured to receive a 2D image signal.

For example, in the display processing device provided by an embodiment of the present disclosure, the 2D image signal in which left and right eye images are respectively arranged in alternate rows comprises a 4K2K image signal, and the 2D image signal comprises a 4K2K image signal.

For example, in the display processing device provided by an embodiment of the present disclosure, the 3D image processing chip comprises a 3D field programmable gate array.

At least one embodiment of the present disclosure provides a display apparatus, comprising: a display panel; and a display processing device, connected with the display panel, the display processing device comprises the display processing device according to any one of claims 1 to 11, and the 2D image processing chip is configured to transmit a signal to the display panel for display.

For example, in the display apparatus provided by an embodiment of the present disclosure, the display panel comprises a 4K2K display panel.

At least one embodiment of the present disclosure provides a display processing method, comprising: processing a 3D image signal into a 2D image signal in which left and right eye images are respectively arranged in alternate rows by a 3D image processing chip; transmitting the 2D image signal in which left and right eye images are respectively arranged in alternate rows obtained after processing to a 2D image processing chip by the 3D image processing chip; and performing image processing on the 2D image signal by the 2D image processing chip.

For example, in the display processing method provided by an embodiment of the present disclosure, the display processing method further comprises: transmitting a 2D image signal to the 2D image processing chip directly by the 3D image processing chip.

For example, in the display processing method provided by an embodiment of the present disclosure, processing the 3D image signal into the 2D image signal in which left and right eye images are respectively arranged in alternate rows by the 3D image processing chip comprises: performing processing on the 3D image signal to form a left-eye image signal and a right-eye image signal; scaling the left-eye image signal and the right-eye image signal respectively; and synthesizing the left-eye image signal and the right-eye image signal obtained after scaling to form the 2D image signal in which left and right eye images are respectively arranged in alternate rows.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to limit to a physical connection or mechanical connection, but may include an electrical connection, directly or indirectly.

Figure 1:
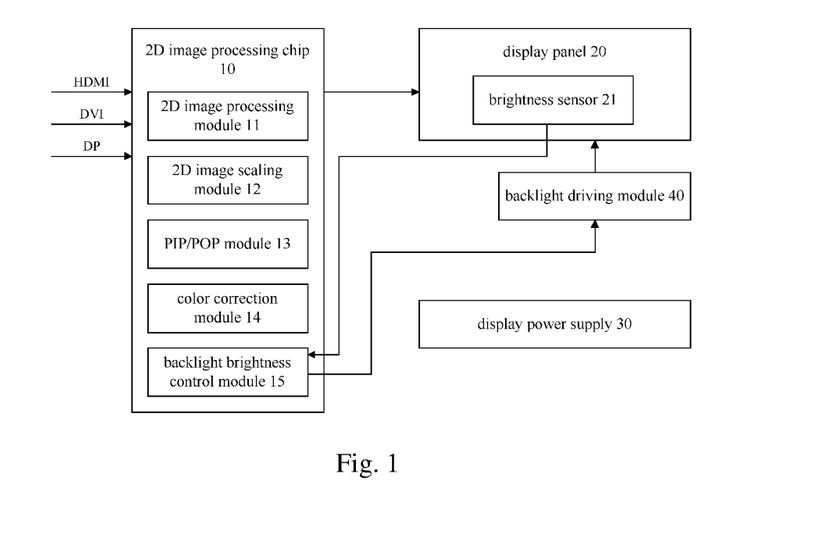
FIG. 1 is a schematic diagram of a medical display apparatus.

FIG. 1 is a schematic diagram of a medical display. As illustrated in FIG. 1, the medical display apparatus includes a 2D image processing chip 10, a display panel 20, a display power supply 30, and a backlight driving module 40. The 2D medical image can be transmitted to the 2D image processing chip 10 by a signal interface such as a HDMI, DVI, DP, or SDI interface. The 2D image processing module 11 in the 2D image processing chip 10 can perform processing such as decoding or the like on the input 2D medical image to process the 2D medical image to a digital signal on which can be performed image processing. In a case that the resolution of the input 2D medical image and the resolution of the display panel 20 are not the same, the 2D image processing chip 10 converts the resolution of the input 2D medical image into the resolution displayed on the display panel 20 by a 2D image scaling module 12 in the 2D image processing chip 10. In a case that there is a plurality of input 2D medical images, the 2D image processing chip 10 can combine a plurality of 2D medical images into one 2D medical image by a picture-in-picture/picture-on-picture (PIP/POP) module 13 in the 2D image processing chip 10. In addition, a color correction module 14 in the 2D image processing chip 10 can perform color correction according to gamma 2.0, gamma 2.2, gamma 2.4, and a gamma curve in digital imaging and communications in medicine (DICOM) in an application customized by a customer. In addition, a backlight brightness control module 15 in the 2D image processing chip 10 can stably control a brightness of the display panel 20 by a backlight driving module 40 according to a brightness sensed by a brightness sensor 21 disposed in the display panel 20. Therefore, the medical display apparatus can satisfy the requirements for consistency and integrity of the display quality.

On the other hand, with the development of medical technology, devices that can acquire medical 3D images (for example, small-sized endoscopes) have gradually matured. For example, by a small-sized endoscope that can acquire 3D images of internal organs, the surgeon can see the depth of field between the organs of the body, so that the relationship between the tissues in the body can be more clearly observed, and the accurate positioning can be achieved. Upon performing surgery, the surgeon can avoid blood vessels more accurately, which can reduce the patient's bleeding and reduce the operation time. Therefore, a display processing device capable of efficiently processing a medical 3D image has a large market space.

Figure 2:
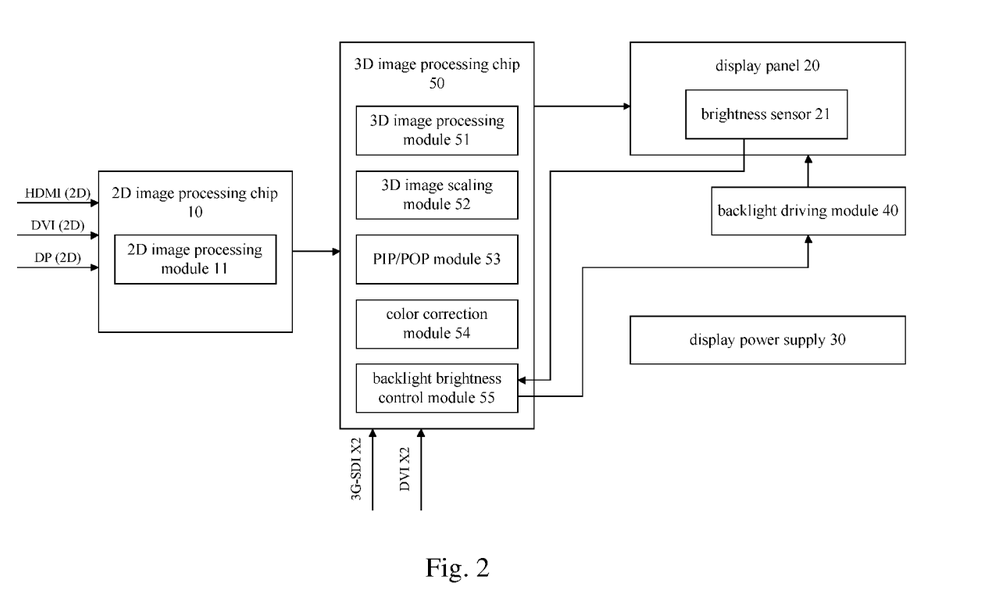
FIG. 2 is a schematic diagram of another medical display apparatus.

FIG. 2 is a schematic diagram of another medical display apparatus. As illustrated in FIG. 2, the medical display apparatus includes a 2D image processing chip 10, a display panel 20, a display power supply 30, a backlight driving module 40, and a 3D image processing chip 50. The 3D medical image can be transmitted to the 3D image processing chip 50 by a signal interface such as a DVI or SDI interface. A 3D image processing module 51, a 3D image scaling module 52, a PIP/POP module 53, and a color correction module 54 in the 3D image processing chip 50 perform 3D image processing, 3D image scaling, PIP/POP processing, color correction processing and the like respectively on the 3D medical image to form a 2D image signal in which left and right eye images are respectively arranged in alternate rows that can be displayed by the display panel 20 and satisfy the requirement for consistency and integrity of the display quality (forming a 3D visual image in human eyes). A backlight brightness control module 55 in the 3D image processing chip 50 is configured to control a brightness of the display panel 20 stably by the backlight driving module 40. In addition, upon a 2D medical image being inputted to the medical display, the 2D medical image also needs to be transmitted to the 3D image processing chip 50 after being processed by the 2D image processing chip 10 to perform PIP/POP processing, color correction processing, and the like. Therefore, the medical display apparatus requires a higher processing capability of the 3D image processing chip, and consumes more resources of the 3D image processing chip.

The embodiments provide a display processing device, a display processing method, and a display apparatus. The display processing device includes a 3D image processing chip and a 2D image processing chip. The 3D image processing chip is configured to receive a 3D image signal, and process the 3D image signal into a 2D image signal in which left and right eye images are respectively arranged in alternate rows; and the 3D image processing chip is configured to transmit the 2D image signal in which left and right eye images are respectively arranged in alternate rows obtained after processing to the 2D image processing chip, and the 2D image processing chip is configured to perform image processing on the 2D image signal. Therefore, the display processing device can perform 3D image processing on the 3D image signal so that the 3D image signal becomes the 2D image signal in which left and right eye images are respectively arranged in alternate rows, which can be displayed on the display panel. In addition, the 3D image processing chip can also transmit the 2D image signal in which left and right eye images are respectively arranged in alternate rows obtained after processing into the 2D image processing chip for further processing, for example, performing further processing by a 2D image processing module and/or color correction module provided in the 2D image processing chip. Therefore, the display processing device has high processing efficiency, and a 2D image processing module and/or a color correction module is not required in the 3D image processing chip, so that the requirements for the processing capability of the 3D image processing chip can be reduced, so that the costs of the display processing apparatus can be reduced.

Hereafter, the display processing device, the display processing method, and the display apparatus provided by the embodiments of the present disclosure will be described.

Figure 3:
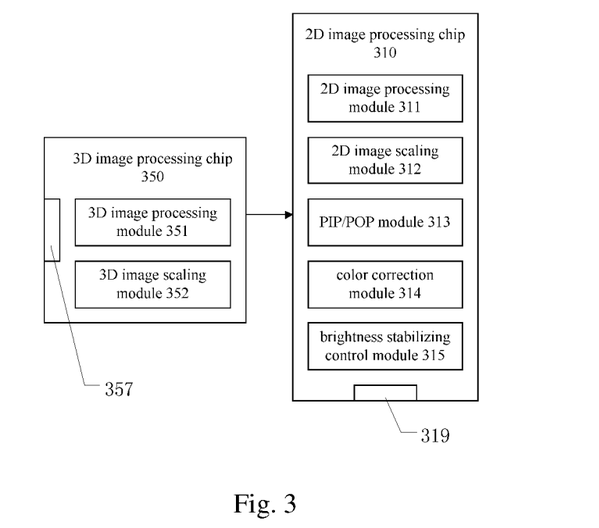
FIG. 3 is a schematic diagram of a display processing device according to an embodiment of the present disclosure.

An embodiment of the present disclosure provides a display processing device. FIG. 3 is a schematic diagram of a display processing device according to the present embodiment. As illustrated in FIG. 3, the display processing device includes a 3D image processing chip 350 and a 2D image processing chip 310. The 3D image processing chip 350 can be configured to receive a 3D image signal and process the 3D image signal into a 2D image signal in which left and right eye images are respectively arranged in alternate rows, and the 3D image processing chip 350 is configured to transmit the 2D image signal in which left and right eye images are respectively arranged in alternate rows obtained after processing to the 2D image processing chip 310, and the 2D image processing chip 310 is configured to perform image processing on the 2D image signal. That is, upon the display processing device processing an image signal, the 3D image processing chip 350 is provided in front of the 2D image processing chip 310. It should be noted that, the above-mentioned 2D image signal in which left and right eye images are respectively arranged in alternate rows refers to that odd-numbered columns in the 2D image in which left and right eye images are respectively arranged in alternate rows corresponding to the 2D image signal are a left-eye image, even-numbered columns in the 2D image in which left and right eye images are respectively arranged in alternate rows corresponding to the 2D image signal are a right-eye image, or, odd-numbered columns of the 2D image signal are a right-eye image, and even-numbered columns of the 2D image signal are a left-eye image. Thus, upon the observer observing the 2D image in which left and right eye images are respectively arranged in alternate rows, the 2D image in which left and right eye images are respectively arranged in alternate rows can form a 3D virtual image.

In the display processing device provided by the embodiment, the display processing device can perform 3D image processing on the 3D image signal, so that the 3D image signal becomes a 2D image signal in which left and right eye images are respectively arranged in alternate rows that can be displayed by the display panel. In addition, the 3D image processing chip can also transmit the processed 2D image signal to the 2D image processing chip for further processing, for example, the 2D image signal is further processed by a 2D image processing module and/or a color correction module provided in the 2D image processing chip. Therefore, the display processing device has high processing efficiency, and the 2D image processing module and/or the color correction module does not need not be provided in the 3D image processing chip, so that the requirements for the processing capability of the 3D image processing chip can be reduced, and thus the costs of the display processing device can be reduced.

For example, in the display processing device provided by an example of the embodiment, as illustrated in FIG. 3, the 3D image processing chip 350 includes a 3D image processing module 351 and a 3D image scaling module 352. The 3D image processing module 351 and the 3D image scaling module 352 are configured to perform processing and scaling on the 3D image signal respectively to form a 2D image signal in which left and right eye images are respectively arranged in alternate rows. Thus, the 2D image signal in which left and right eye images are respectively arranged in alternate rows is obtained after processing and scaling, and can be further processed by the 2D image processing chip 310.

For example, in the display processing device provided in an example of the embodiment, as illustrated in FIG. 3, the 2D image processing chip 310 includes at least one of a 2D image processing module 311, a color correction module 314, and a 2D image scaling module 312. The 2D image processing module 312 is configured to perform 2D image processing on the 2D image signal in which left and right eye images are respectively arranged in alternate rows. The color correction module 314 is configured to perform color correction on the 2D image signal in which left and right eye images are respectively arranged in alternate rows. The 2D image scaling module 312 is configured to perform scaling on the 2D image signal. Therefore, the 2D image signal in which left and right eye images are respectively arranged in alternate rows, after being processed by the 2D image processing chip, can meet the requirements for consistency and integrity of the display quality of the medical display. In addition, the color correction module may not be provided in the 3D image processing chip, so that the requirement for the processing capability of the 3D image processing chip can be reduced, and the cost of the display processing device can be reduced.

For example, as illustrated in FIG. 3, the 2D image processing chip 310 can further include a PIP/POP module 313 to perform picture-in-picture or picture-on-picture processing on the image signal transmitted to the 2D image processing chip 310.

It is worth noting that, because the 3D image processing chip for processing 3D image signals is more expensive than the 2D image processing chip, at least one of the image processing module 311, the PIP/POP module 313, the color correction module 314, and the 2D image scaling module 312 is integrated in the 2D image processing chip, the requirements for the processing capability of the 3D image processing chip can be reduced, so that the costs of the display processing device can be reduced.

For example, in a case that the display processing device as illustrated in FIG. 3 is used in a medical display apparatus, upon the input signal being a 3D image signal, the image processing module 351 and the 3D image scaling module 352 process and scale the 3D image signal respectively to form the 2D image signal in which left and right eye images are respectively arranged in alternate rows, and transmits the 2D image signal in which left and right eye images are respectively arranged in alternate rows to the 2D image processing chip 310. The PIP/POP module 313 in the 2D image processing chip 310 can combine a plurality of 2D image signal in which left and right eye images are respectively arranged in alternate rows obtained after processing to form a 2D medical image. The color correction module 314 in the 2D image processing chip 310 can perform color correction on the 2D image signal in which left and right eye images are respectively arranged in alternate rows obtained after processing according to gamma 2.0, gamma 2.2, gamma 2.4, and a gamma curve in digital imaging and communications in medicine (DICOM) in an application customized by the customer.

For example, in the display processing device provided by an example of the embodiment, as illustrated in FIG. 3, the 3D image processing chip 350 can also receive a 2D image signal, and the 3D image processing chip 350 can directly transmit the 2D image signal to the 2D image processing chip 310. That is, the 3D image processing chip can directly transmit the 2D image signal to the 2D image processing chip. Thus, upon the input signal being a 2D image signal, it does not occupy the resources of the 3D image processing chip and is directly processed by the 2D image processing chip, thereby further reducing the requirements for the processing capability of the 3D image processing chip, reducing the costs of the display processing device. For example, in a case that the display processing device as illustrated in FIG. 3 is used in a medical display, upon the input signal is a 2D image signal, the 3D image processing chip 350 can directly transmit the 2D image signal to the 2D image processing chip 310. The 2D image processing module 311 in the 2D image processing chip 310 can perform processing such as decoding and the like on the input 2D medical image to form a digital signal that can be image-processed. Upon the resolution of the input 2D medical image and the resolution of the display panel being different, the 2D image processing chip 310 would use the 2D image scaling module 312 in the 2D image processing chip 310 to convert the resolution of the input 2D medical image into the resolution displayed on the display panel. Upon there being multiple 2D medical images to input, the 2D image processing chip 310 can use the PIP/POP module 313 in the 2D image processing chip 310 to combine the multiple 2D medical images into a 2D medical image. In addition, the color correction module 314 in the 2D image processing chip 310 can perform color correction according to gamma 2.0, gamma 2.2, gamma 2.4, and a gamma curve in digital imaging and communications in medicine (DICOM) in an application customized by the customer.

For example, in the display processing device provided in an example of the embodiment, as illustrated in FIG. 3, the display processing device further includes a brightness stabilizing control module 315 configured to adjust a brightness of emitting light of the backlight module in the display panel according to a display brightness of the display panel, so as to adjust the display brightness of the display panel. The brightness stabilizing control module 315 is integrated in the 2D image processing chip 310. Thus, the requirement for the processing capability of the 3D image processing chip can be further reduced, and the cost of the display processing device can be reduced.

For example, in the display processing device provided in an example of the embodiment, as illustrated in FIG. 3, the 3D image processing chip 350 includes a first signal interface 357, and the first signal interface 357 can receive the 3D image signal and the 2D image signal.

For example, the first signal interface can be at least one of a 3G-SDI (serial digital interface) and a DVI (digital video interface).

For example, in the display processing device provided in an example of the embodiment, the 3D image processing chip 350 and the 2D image processing chip 310 are connected by a high-speed interface. Therefore, the transmission rate between the 3D image processing chip and the 2D image processing chip can be improved. For example, the bandwidth of the high interface is greater than 18 Gbps.

For example, in the display processing device provided in an example of the embodiment, the 2D image processing chip 310 further includes a second signal interface 319, and the second signal interface 319 can receive a 2D image signal. In other words, the second signal interface can directly receive the input signal.

For example, the second signal interface can be at least one of a HDMI interface (high definition multimedia interface), a DVI interface, and a DP interface.

For example, in the display processing device provided in an example of the present embodiment, the 2D image signal in which left and right eye images are respectively arranged in alternate rows includes a 4K2K image signal, and the 2D image signal includes a 4K2K image signal. Because the data amount of the 4K2K image signal is large, the display processing device provided in the embodiment can effectively reduce the occupation of the resources of the 3D image processing chip upon processing the 4K2K image signal and reduce the processing capability of the 3D image processing chip.

For example, in the display processing device provided by an example of the embodiment, the 3D image processing chip includes a 3D field programmable gate array (FPGA).

Figure 4:
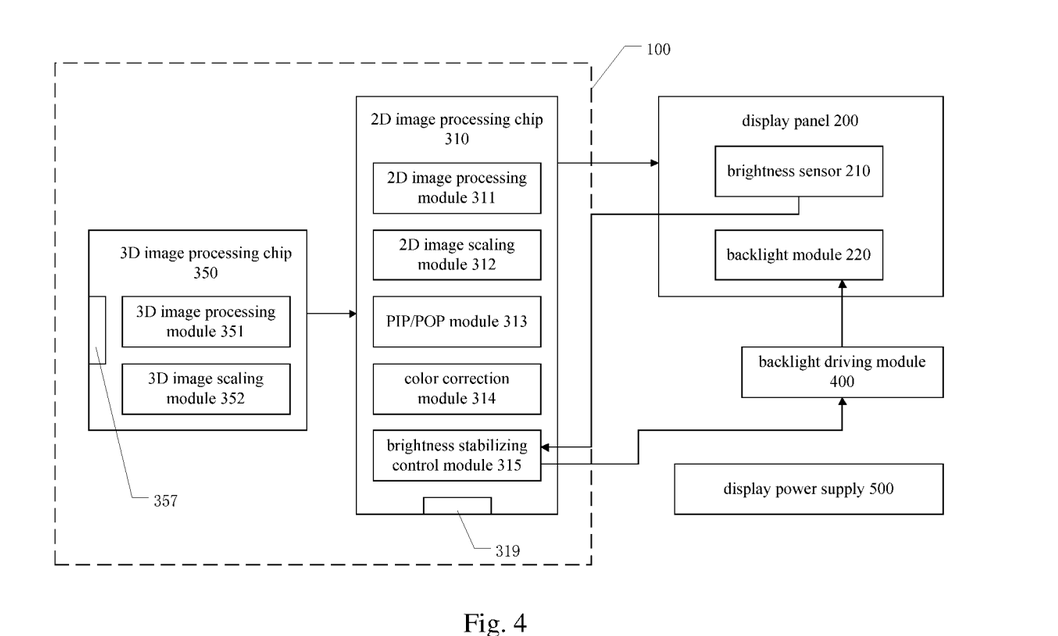
FIG. 4 is a schematic diagram of a display apparatus provided by an embodiment of the present disclosure.

An embodiment of the present disclosure provides a display apparatus. FIG. 4 is a schematic diagram of a display apparatus according to the present embodiment. As illustrated in FIG. 4, the display apparatus includes a display processing device 100 and a display panel 200. The display panel 200 is connected, for example, communicatively connected, with the display processing device 100. The display processing device 100 can be the display processing device described in any one of the examples of the embodiment, and the 2D image processing chip in the display processing device transmits signals to the display panel for display. Therefore, the display apparatus has a technical effect corresponding to the technical effect of the display processing device included therein. For details, reference can be made to the related description in the abovementioned embodiments. For example, the display processing device has high processing efficiency, and the 2D image processing module and/or the color correction module does not need to be provided in the 3D image processing chip, so that the requirements for the processing capability of the 3D image processing chip can be reduced, thereby reducing the costs of the display processing device, the cost of the display apparatus is low.

For example, as illustrated in FIG. 4, the display apparatus further includes a backlight driving module 400. The display panel 200 includes a brightness sensor 210 and a backlight module 220. Thus, the backlight brightness control module 315 in the 2D image processing chip 310 can control the brightness of the display panel 200 stably by the backlight driving module 400 according to a display brightness sensed by the brightness sensor 210 provided in the display panel 200. Thus, the display apparatus can satisfy the requirements for uniformity and integrity of display brightness.

For example, in the display apparatus provided by an example of the embodiment, the display panel is a 4K2K display panel. Thus, the display panel can be used to display a 4K2K image.

For example, as illustrated in FIG. 4, the display apparatus also includes other usual components to implement the functions of the display apparatus. For example, the display apparatus can further include a display panel power supply 500 for providing power to the display panel 200.

Figure 5:
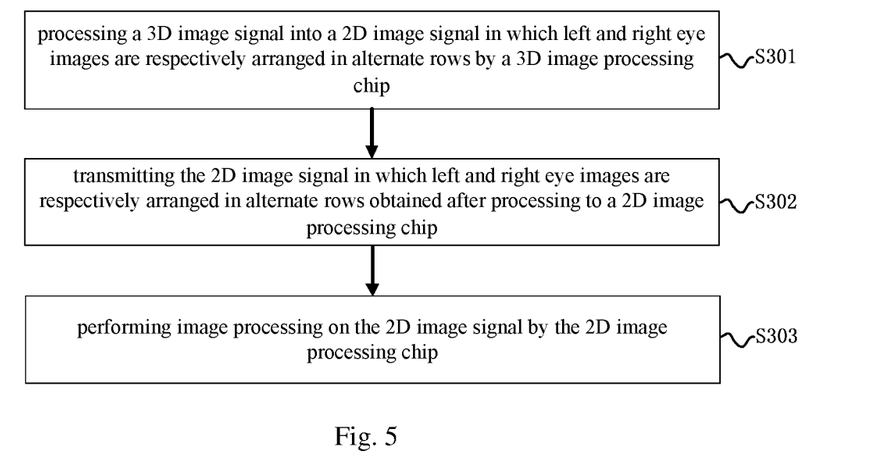
FIG. 5 is a schematic diagram of a display processing method according to an embodiment of the present disclosure.

One embodiment of the present disclosure provides a display processing method. FIG. 5 is a display processing method according to the present embodiment. As illustrated in FIG. 5, the display processing method includes steps S301-S303.

Step S301: processing a 3D image signal into a 2D image signal in which left and right eye images are respectively arranged in alternate rows by a 3D image processing chip;

Step S302: transmitting the 2D image signal in which left and right eye images are respectively arranged in alternate rows obtained after processing to a 2D image processing chip by the 3D image processing chip;

Step S303: performing image processing on the 2D image signal by the 2D image processing chip.

In the display processing method provided in the embodiment, the 3D image processing chip can perform 3D image processing on the 3D image signal, so that the 3D image signal becomes a 2D image signal in which left and right eye images are respectively arranged in alternate rows that can be displayed by the display panel. In addition, the 3D image processing chip can also transmit the 2D image signal in which left and right eye images are respectively arranged in alternate rows obtained after processing into a 2D image processing chip for further processing, for example, can be further processed by a 2D image processing module and/or a color correction module in the 2D image processing chip. Thus, the display processing method has high processing efficiency, and does not require the 2D image processing and/or the color correction processing to be provided in the 3D image processing chip, so that the requirements for the processing capability of the 3D image processing chip can be reduced, and the costs of the processing method can be reduced.

For example, the display processing method provided in an embodiment of the embodiment can further include: directly transmitting the 2D image signal to the 2D image processing chip by the 3D image processing chip. Thus, upon the input signal being a 2D image signal, it does not occupy the resources of the 3D image processing chip and is directly processed by the 2D image processing chip, thereby further reducing the requirement for the processing capability of the 3D image processing chip, and reducing the cost of the display processing method.

For example, in the display processing method provided in an embodiment of the present embodiment, processing the 3D image signal into the 2D image signal in which left and right eye images are respectively arranged in alternate rows by a 3D image processing chip includes: performing processing on the 3D image signal to form a left-eye image signal and a right-eye image signal; scaling the left-eye image signal and the right-eye image signal respectively; and synthesizing the left-eye image signal and the right-eye image signal obtained after scaling to form the 2D image signal in which left and right eye images are respectively arranged in alternate rows.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A display processing device, comprising:
 a 3D image processing chip, configured to receive a 3D image signal and process the 3D image signal into a 2D image signal in which left and right eye images are respectively arranged in alternate rows; and
 a 2D image processing chip,
 wherein the 3D image processing chip is configured to transmit the 2D image signal in which left and right eye images are respectively arranged in alternate rows obtained after processing to the 2D image processing chip, and the 2D image processing chip is configured to perform image processing on the 2D image signal,
 wherein the 3D image processing chip comprises a 3D image processing module and a 3D image scaling module, and the 3D image processing module and the 3D image scaling module are configured to perform processing on the 3D image signal to form a left-eye image signal and a right-eye image signal; scaling the left-eye image signal and the right-eye image signal respectively; and synthesizing the left-eye image signal and the right-eye image signal obtained after scaling to form the 2D image signal in which left and right eye images are respectively arranged in alternate rows.

2. The display processing device according to claim 1, wherein the 2D image processing chip comprises at least one of a 2D image processing module, a color correction module, and a 2D image scaling module, the 2D image processing module is configured to perform 2D image processing on the 2D image signal in which left and right eye images are respectively arranged in alternate rows, the color correction module is configured to perform color correction on the 2D image signal in which left and right eye images are respectively arranged in alternate rows, and the 2D image scaling module is configured to perform scaling on the 2D image signal.

3. The display processing device according to claim 1, wherein the 3D image processing chip is further configured to receive an external 2D image signal, and the 3D image processing chip is further configured to transmit the external 2D image signal to the 2D image processing chip directly.

4. The display processing device according to claim 1, further comprising:
a brightness stabilizing control module, configured to adjust a brightness of emitting light of a backlight module in a display panel according to a display brightness of the display panel,
wherein the brightness stabilizing control module is integrated in the 2D image processing chip.

5. The display processing device according to claim 1, wherein the 3D image processing chip comprises a first signal interface, configured to receive the 3D image signal and an external 2D image signal.

6. The display processing device according to claim 5, wherein the first signal interface comprises at least one of a 3G-SDI and a DVI.

7. The display processing device according to claim 1, wherein the 3D image processing chip and the 2D image processing chip are connected by a high-speed interface.

8. The display processing device according to claim 1, wherein the 2D image processing chip further comprises a second signal interface configured to receive an external 2D image signal.

9. The display processing device according to claim 3, wherein the 2D image signal in which left and right eye images are respectively arranged in alternate rows comprises a 4K2K image signal, and the external 2D image signal comprises a 4K2K image signal.

10. The display processing device according to claim 1, wherein the 3D image processing chip comprises a 3D field programmable gate array.

11. A display apparatus, comprising:
a display panel; and
a display processing device, connected with the display panel,
wherein the display processing device comprises the display processing device according to claim 1, and the 2D image processing chip is configured to transmit a signal processed by the 2D image processing chip to the display panel for display.

12. The display apparatus according to claim 11, wherein the display panel comprises a 4K2K display panel.

13. A display processing method, comprising:
processing a 3D image signal into a 2D image signal in which left and right eye images are respectively arranged in alternate rows by a 3D image processing chip;
transmitting the 2D image signal in which left and right eye images are obtained after processing to a 2D image processing chip by the 3D image processing chip; and
performing image processing on the 2D image signal by the 2D image processing chip,
wherein processing the 3D image signal into the 2D image signal in which left and right eye images are respectively arranged in alternate rows by the 3D image processing chip comprise:
performing processing on the 3D image signal to form a left-eye image signal and a right-eye image signal;
scaling the left-eye image signal and the right-eye image signal respectively; and
synthesizing the left-eye image signal and the right-eye image signal obtained after scaling to form the 2D image signal in which left and right eye images are respectively arranged in alternate rows.

14. The display processing method according to claim 13, further comprising:
transmitting a 2D image signal to the 2D image processing chip directly by the 3D image processing chip.

15. The display processing device according to claim 1, further comprising:
a brightness stabilizing control module, configured to adjust a brightness of emitting light of a backlight module in a display panel according to a display brightness of the display panel,
wherein the brightness stabilizing control module is integrated in the 2D image processing chip.

* * * * *

UNITED STATES PATENT AND TRADEMARK OFFICE
CERTIFICATE OF CORRECTION

PATENT NO. : 10,681,330 B2
APPLICATION NO. : 16/067995
DATED : June 9, 2020
INVENTOR(S) : Xinshe Yin Page 1 of 1

It is certified that error appears in the above-identified patent and that said Letters Patent is hereby corrected as shown below:

On the Title Page

Item (30) Foreign Application Priority Data:
Change "Dec. 20, 2017" to --May 12, 2017--.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*